Patented June 2, 1925.

1,540,152

UNITED STATES PATENT OFFICE.

KENNETH L. WEBER, OF AUGUSTA, GEORGIA, ASSIGNOR OF ONE-THIRD TO CHARLES WEBER, OF CINCINNATI, OHIO.

COMPOSITION FOR MAKING FLEXIBLE, TRANSPARENT, WATERPROOF WINDOWS AND THE PRODUCT THEREOF.

No Drawing. Application filed August 5, 1921. Serial No. 490,184.

*To all whom it may concern:*

Be it known that I, KENNETH L. WEBER, a citizen of the United States, residing in Augusta, in the county of Richmond and State of Georgia, have invented a new and useful Composition for Making Flexible, Transparent, Waterproof Windows and the Product Thereof, of which the following is a specification.

The object of my invention is the production of a highly flexible, transparent and water-proof composition which will not readily burn and which will not easily break or crack when bent, and which is particularly adaptable and desirable as window panes for automobile curtains, thereby adapting them to be readily folded or rolled without injury to the window; also for tail lights on automobiles, and signal lights.

My composition consists of a compound of refined, granulated or so-called sparkling gelatine, glycerine, distilled water, formaldehyde and the finished product having a coating of pure water-proof or so-called spar varnish.

In preparing the composition, I prefer to use the ingredients in substantially the following proportions: fifteen grams of refined, granulated, or so-called sparkling gelatine; five minims of glycerine; one hundred and twenty minims of distilled water; one minim of formaldehyde. Good results may be obtained, however, when the ingredients are varied within the following limits: fifteen to twenty grains of refined, granulated, or so-called sparkling gelatine; 4 to 6 minims of glycerine; 60 to 180 minims of distilled water; 1 to 2 minims of formaldehyde, and the resultant product having a coating of pure water-proof, so-called spar varnish or any other suitable material.

To make a piece of the material one square foot in size, multiply the above by 22. If the piece is to be thinner, use less, or if the piece is to be thicker, use more. The consistency of the material is varied by increasing or diminishing the proportion of glycerine. More glycerine increases the pliability, and diminishing the glycerine makes it more brittle or hard and less pliable.

To make the composition, proceed preferably as follows:

Provide a clean metal receptacle or pot in which to prepare the material ready for the mold. The mold may be made of highly polished surface like plate glass and can of course be of any shape and size desired. The mold is either coated with bees wax or preferably can be made of bees wax which is poured melted and allowed to become hard. This gives it a smooth surface and makes the mold level so that when the gelatine solution is poured onto it, it is level, and, therefore, makes the material of even thickness throughout. By using a bees wax mold the solution can be allowed to get thoroughly dry in the mold, instead of hanging it up on a frame to dry.

Place a quantity of gelatine in the receptacle or pot, then add the glycerine, then add the distilled water, then heat slowly, stirring constantly until it comes to a boil, then remove from the fire or heat, then skim off the scum, then add the formaldehyde, then strain through gauze or cheese cloth and pour into a mold, then remove any bubbles, etc., preferably with a pointed instrument and allow the material to remain in the mold until thoroughly dry when it may be handled without tearing. After removing from the mold give it a coat on both sides of pure water-proof or so-called spar varnish and then hang up in a frame to dry. When it is thoroughly dry it it ready to be cut in the desired shape and size, and used.

As stated this product is intended for use as window panes in automobile curtains and the like, and is superior to the celluloid windows now used, because it does not easily crack or break when folded or bent and does not become discolored or lose its transparency from prolonged exposure to the elements. It is also adaptable for use as films for moving pictures and the like, and is superior to the celluloid film, because it will not crack and break as easily, and also the fire hazard is much diminished as this product is not highly inflammable and is not ignited by a spark or exposure to heat, but must come into direct contact with a live flame, when it burns slowly and is easily extinguished by blowing it out.

It can be used in many instances instead of glass, for instance, in picture frames, watch crystals and the like, where a transparent article is useful which is not subject to cracking or breaking, and could be used in place of glass in windows where cracked or broken glass is frequent. A piece can be stretched in a rigid frame and used in a window or door and the like.

I claim:

1. The herein described flexible, transparent, waterproof window for automobile curtains and the like, made from a sheet consisting by weight of about fifteen grains of refined granulated or so called sparkling gelatine, five minims of glycerine, one hundred and twenty minims of distilled water and one minim of formaldehyde and having a transparent coating of water proof varnish.

2. The herein described flexible, transparent, waterproof windows for automobile curtains and the like, made from a sheet consisting by weight of about fifteen grains of refined granulated or so called sparkling gelatine, five minims of glycerine, one hundred and twenty minims of distilled water and one minim of formaldehyde.

KENNETH L. WEBER.